April 15, 1969

D. L. BISE 3,439,295

MECHANICAL FILTER WITH ATTENUATION POLES
ON BOTH SIDES OF PASSBAND

Filed June 13, 1966

INVENTOR.
DONALD L. BISE

BY
Moody and Phillion
ATTORNEYS

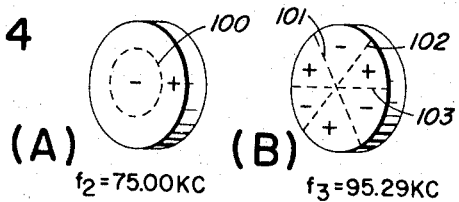
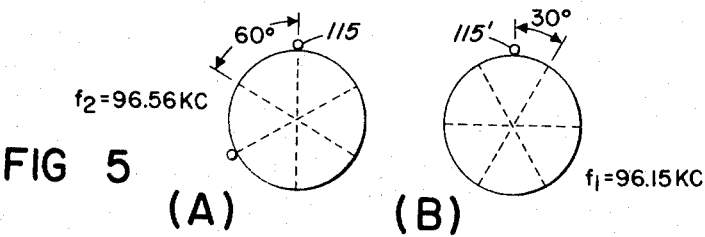
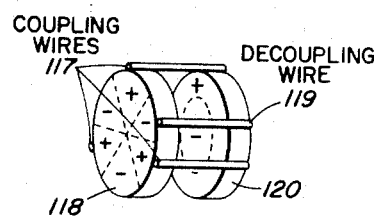
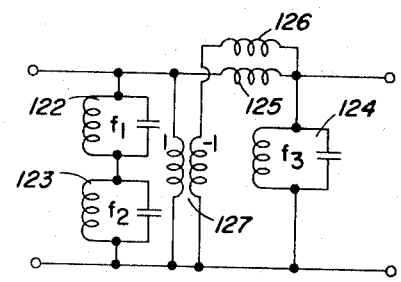
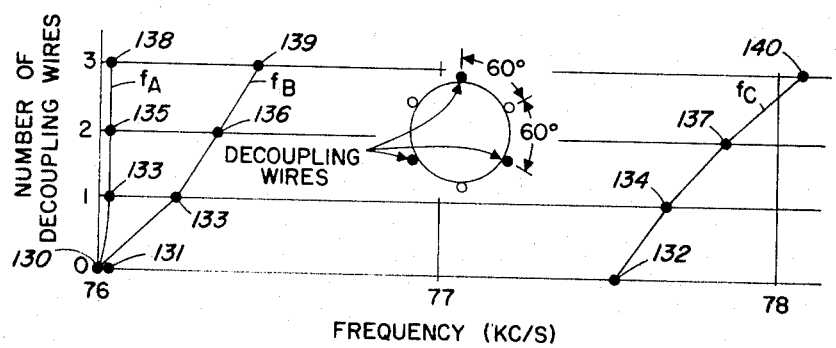

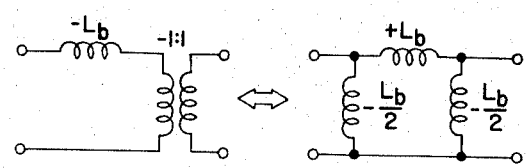
(A)    FIG 17    (B)
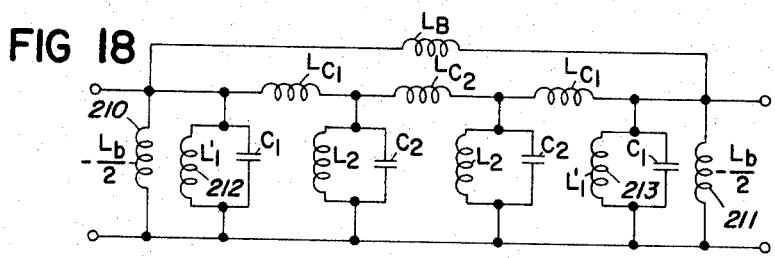
FIG 18
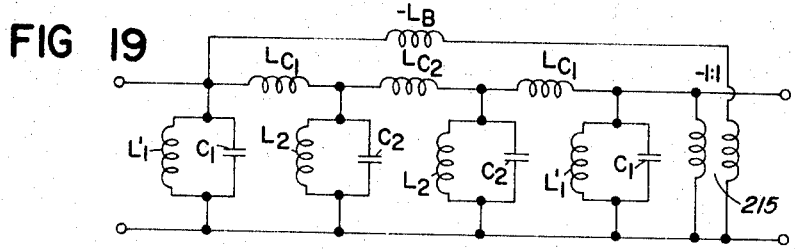
FIG 19
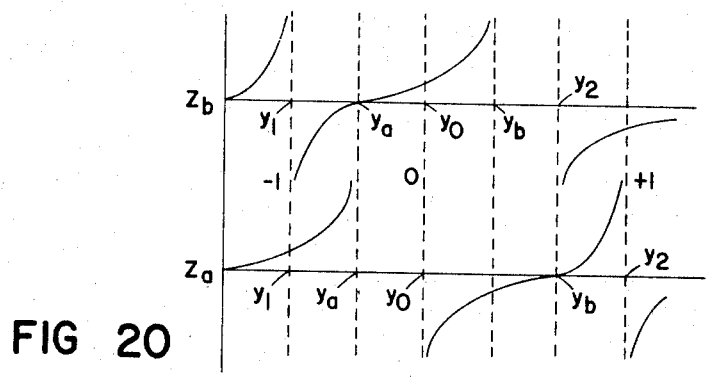
FIG 20
INVENTOR.
DONALD L. BISE
BY Moody and Phillion
ATTORNEYS 15, 1969

United States Patent Office 3,439,295
Patented Apr. 15, 1969

3,439,295
MECHANICAL FILTER WITH ATTENUATION POLES ON BOTH SIDES OF PASSBAND
Donald L. Bise, Costa Mesa, Calif., assignor to Collins Radio Company, Cedar Rapids, Iowa, a corporation of Iowa
Filed June 13, 1966, Ser. No. 557,300
Int. Cl. H03f 7/04, 13/00
U.S. Cl. 333—71         16 Claims This invention relates generally to mechanical filters and, more specifically, to mechanical filters having attenuation poles on both sides of the passband.

The mechanical filters of the prior art do not have attenuation poles on both sides of their passbands. While selectivity is sharp, the upper and lower skirts of the passband are relatively smooth curves which flare out at the bottom of the passband, and which do not exhibit attenuation poles. It would be desirable to obtain attenuation poles on either side of the passband and thereby increase selectivity.

The mechanical filters which have been most successful in commercial application and which comprise the type to be discussed herein, consist of a plurality of circular discs stacked one upon the other in a concentric manner, but spaced apart a predetermined distance. The discs are held in position by conventional coupling wires which pass along the edge of the discs and are secured to the perimeters of each of the discs. Several of these coupling wires are spaced around the circumference of the discs. The input and output means, in the more successful type mechanical filter, consist of a magnetostrictive rod fixed to the center of each of the two end discs. The input rod is energized by a coil wound therearound which functions to set the end disc into vibration when an A-C signal is supplied to the coil. Such vibrations pass from disc to disc through the coupling wires and down through the stack of discs to the magnetostrictive rod at the other end where the winding thereon transforms the signal back into an intelligible signal. The discs function to pass only those vibrations which lie within the passband of the mechanical filter; all other vibrations are very substantially attenuated.

In most of the prior art of mechanical filters, particularly those which have found extensive commercial success, each disc is caused to vibrate in the circular mode. The circular or circle mode of vibration is similar to that of the bottom of an oil cup, with the nodes being concentric around the center of the bottom of the oil cup, or in the case of the disc, with the nodes being circular in shape and concentric with the center of the disc. In most cases each disc has but one node, which lies somewhere between the center of the disc and the perimeter of the disc.

In the prior art an attenuation pole has been obtained at the upper edge of the passband. The specific structure for accomplishing or obtaining such attenuation pole is described in U.S. Patent 3,135,933, issued June 2, 1964 to Robert A. Johnson and entitled "'M' Derived Filter."

The general theory on which the above structure is based is as follows. It is a characteristic of mechanical filters that there is little or no phase shift, in the signals at the lower end of the passband as such signals pass from disc to disc. However, at the upper end of the passband there is about a 180 degree phase shift in the signals as they pass from disc to disc. More specifically, the vibration of each disc is 180 degrees out of phase with the vibration of the adjacent discs at or near the upper end of the passband. The phase relation between the vibration of adjacent discs through the passband is a gradually increasing one for 0 degrees to 180 degrees.

In the "M" Derived Filter one of the mechanical discs has an edge beveled off, i.e., a segment of the edge has been ground off to present a section along the edge where a coupling wire can pass across said beveled or segmented disc without actually touching said disc. A bridging wire is positioned across the beveled portion of the segmented disc and secured to the disc on either side thereof. As discussed above, at the higher end of the passband there is 180-degree shift in phase between the vibrations of adjacent discs. Therefore, in the case of a three-disc filter section, the phase shift in the vibrations passing through a conventional coupling wire means over the three discs, i.e., from disc #1 to disc #2 to disc #3, the phase shift is 180 degrees plus a second 180 degrees, or 360 degrees. On the other hand, the phase shift in vibrations passing directly from disc #1 to disc #3 through the bridging wire is only 180 degrees, since no connecting is made to disc #2. Thus the two vibrations tend to cancel each other at the higher end of the passband.

It is to be noted that such cancellation effect becomes pronounced only just beyond the upper end of the passband and is not of much effect in the passband itself for the following reasons. The filter is designed and the dimensions of the bridging wire are designed so that the amount of energy passing therethrough is small compared to the amount of the energy passing through the conventional coupling wires. Thus in the passband itself, when the energy passing through the coupling wires is large, the canceling effect of energy flowing through the bridging wire is relatively small. However, just beyond the upper edge of the passband, when attenuation through the conventional coupling wires occurs with three discs rather than two, as in the case of the bridging wire, a point is reached when the energy supplied through the conventional coupling wires decreases to an amount equal to the energy supplied through the bridging wire. At this point substantially complete cancellation occurs and an attenuation pole will occur. Such attenuation pole is, as discussed above, just beyond the high frequency edge of the passband.

However, such attenuation pole is obtained only at the upper end of the passband, and not at the lower end.

An object of the present invention is to provide a mechanical filter having attenuation poles at both the upper edge and the lower edge of the passband.

A second purpose of the present invention is a mechanical filter having a greater selectivity than prior art mechanical filters.

A third object of the invention is the improvement of mechanical filters, generally.

Before setting forth a general statement of the invention, it is believed desirable to discuss a mode of vibration of a circularly shaped disc, other than the well known circular mode of vibration, discussed above. The new type mode of vibration is a diameter mode vibration wherein the disc flexes back and forth simultantaneously about several diameters thereof. Usually such diameter mode type vibration occurs around three diameters in an unloaded condition, and six diameters in a loaded condition. By "loaded condition" is meant a condition wherein a coupling wire is affixed to the perimeter thereof, as will be discussed in detail later herein.

Assuming the disc to vibrate around three diameters thereof with the diameters located 60 degrees apart, the disc is divided into six pie-shaped segments with each segment vibrating in a phase opposite to that of the two adjacent segments.

In accordance with the present invention, there is provided a mechanical filter section comprised of four discs positioned in a stacked arrangement with their axes lying along a common line and spaced apart a distance less than half the wavelength of the neutral frequency of said discs. The first disc is a diameter mode type disc, and the second, third, and fourth discs are circular mode type discs; said discs being positioned in the order listed and held in such position by conventional coupling wires extending along said stack and secured to the perimeters of said discs. Such coupling wires are secured to the perimeter of said diameter mode type discs at points all of which have the same phase of vibration.

The second and third discs are segmented, i.e., a portion of the edges thereof are removed to provide clearance for a bridging wire extending from the first to the fourth disc. Such bridging wire is connected to a particular segment of the diameter mode disc (the first disc) whose phase of vibration is 180 degrees removed from those segments to which the conventional coupling wires are attached. Thus at the high end of the passband there will be a phase shift of 3×180 degrees, or 540 degrees through the four discs due to the energy supplied through the conventional coupling wires. The 540 degrees is, of course, equivalent to 180 degrees.

The phase shift of the energy transferred from the first disc to the fourth disc over the bridging wire also experiences a phase reversal of 180 degrees. However, since the bridging wire is coupled to a segment of the diameter mode disc whose phase is 180 degrees removed from that of the segments to which the conventional coupling wires are connected, the overall result is that the energy supplied from the first disc, i.e., the diameter mode disc, to the fourth disc, experiences a 360 degree phase shift and tends to cancel the energy supplied to the fourth disc along the conventional coupling wires. As in the case of the "M" Derived Filter, the effect of the canceling phenomena does not become pronounced until the frequency of the signal has gone just beyond the upper limit of the passband.

At the lower end of the passband, where the phase shift from disc to disc is zero degrees, the cancellation feature will also be present. More specifically, the signal transferred from the first diameter mode disc through the second and third disc to the fourth disc experiences substantially no phase change. However, since the bridging wire is connected to a segment of the diameter mode disc whose phase is 180 degrees removed from that of those segments to which the conventional coupling wires are connected, the energy transferred from the diameter mode disc through the bridging wire to the fourth disc is 180 degrees removed from the energy transferred along the conventional coupling wires. Thus an attenuation pole will be created at the lower end of the passband.

It is to be understood that the obtaining of the attenuation poles at the upper and lower end of the passband can be obtained only by designing the mechanical filter section within predetermined tolerances. To obtain the specific design requirements, it is necessary to make a mathematical analysis of the operation of the mechanical filter section. Such mathematical analysis is best obtained by employing electrical equivalent filter circuits which have attenuation poles at both ends of the passband and then, by various well-known circuit transformations, to transform such filter circuits into a filter circuit which is analogous, element for element, to the elements of a mechanical filter. Then, by examination of the mathematical analysis of the electrical circuits, the specific requirements and tolerances required to design a mechanical filter section having attenuation poles both at the lower and upper end of the passband will be determined.

In accordance with a feature of the invention, decoupling wire means are employed to remove the effects of a spurious attenuation pole. More specifically, it has been found that in a mechanical filter structure employing a diameter mode disc, a spurious attenuation pole frequency occurs in the lower skirt of the sideband. Such attenuation pole introduces distortion and lowers selectively. By connecting decoupling wires between the perimeters of the diameter mode disc and the adjacent circular mode disc, and specifically the perimeter of the diameter mode disc, at a point where the phase of vibration is 180 degrees remoed from that of those points to which the conventional coupling wires are attached, it has been found that the spurious attenuation point is moved well away from the passband of the filter.

The above-mentioned and other objects and features of the invention will be more fully understood from the following detailed description thereof when read in conjunction with the drawings in which:

FIGS. 4a and 4b show a circular mode and diameter mode type disc;

FIGS. 5a and 5b show the different diameter modes of vibration of a loaded disc;

FIG. 6 shows a pair of discs coupled together with a conventional coupling wire and decoupling wires; one of said discs being a diameter mode type disc and the other being a circular mode type disc;

FIG. 7 shows the equivalent electrical circuit of the structure of FIG. 6;

FIG. 8 is a chart showing the relation between the number of decoupling wires, with respect to the relative positions of a spurious attenuation pole, and the frequency response curve of the coupled pair of discs of FIG. 6;

FIGS. 17a and 17b show a transformation which is utilized in connection with FIG. 11 to obtain the circuit of FIG. 19;

FIG. 18 is a step in the transformation of the circuit of FIG. 11 to that of FIG. 19 using the transformation technique of FIGS. 17a and 17b;

FIG. 19 is the resultant electrical circuit derived from the circuit of FIG. 11 and represents the equivalent electrical circuit of the four-disc mechanical filter section of FIG. 1; and FIG. 20 shows a normalized version of the curves of FIG. 16 in terms of $y$.

The specification will be considered in four general sections as defined briefly below:

(I) *General description of the mechanical filter of the present invention*

This section will discuss the general structure of the mechanical filter of the present invention in a qualitative manner.

(II) *The nature and use of a diameter mode type disc*

This section discusses the characteristics of an unloaded and loaded diameter mode type disc and its use in such mechanical filter.

(III) *Discussion of circuit transformations employed herein and mathematical analysis thereof*

This section will discuss the equivalent electrical circuits of the mechanical filter section and the transformations required to transform a conventional electrical circuit equivalent of a mechanical filter into one which can be used in connection with a mechanical filter section having a diameter mode disc. This section will also set forth the mathematical analysis of the equivalent circuits of a mechanical filter and will evolve specific mathematical expressions from which can be deduced specific design parameters of a mechanical filter having attenuation poles on both sides of the frequency response curve.

(IV) *General conclusions*

This section will discuss in detail the end expressions evolved in Section II from which are determined the specific design parameters of the mechanical filter of the present invention.

Figure 1:
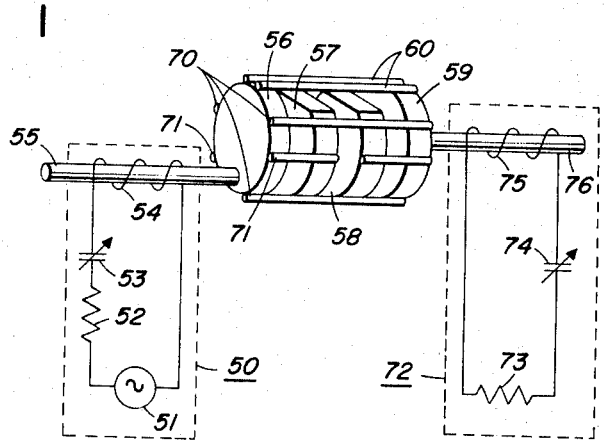
FIG. 1 is a combination perspective view and schematic diagram of a four-disc section embodying the present invention.

(I) *General description of a mechanical filter of the present invention.*—Referring now to FIG. 1, there is shown a combination perspective and schematic diagram view of a four-disc mechanical filter using a diameter mode disc as one of the four discs.

In FIG. 1 the input is designated as that structure within the dotted block 50 and is comprised of a signal source 51, a current limiting resistor 52, a tuning capacitor 53, a winding 54, and a magnetostrictive type rod 55, which can be of a nickel alloy.

The signal supplied from source 51 sets up the vibrations in rod 55 due to the changing magnetic flux in winding 54. These vibrations are supplied to end disc 56 which is, in this particular embodiment, a diameter mode type disc. The rod 55 must be located off center of the diameter mode disc in order to excite the diameter mode. The vibrations in disc 56 are then supplied via coupling wires 70 to circular mode disc 57, then to circular mode disc 58, and finally to the circular mode end disc 59.

The mechanical vibrations are next supplied to magnetostrictive rod 76 which, in turn, functions to generate a signal in coil 75 which, along with rod 76, form a part of output means 72. Also included in output means 72 is tuning capacitor 74 and load resistor 73, which can be any suitable load such as the input to an amplifier, for example.

Also present are two bridging wires 60 which connect diameter mode disc 56 to circular mode disc 59, but which pass over segmented discs 57 and 58 without touching them. It will be noted that segmented discs 57 and 58 are so named because they have a segment thereof removed from one edge, to permit the bridging wires 60 to pass thereby without touching said segmented discs.

In a mechanical filter structure employing a diameter mode disc, there often occurs a spurious attenuation pole in the lower skirt of the passband. It has been found that by adding decoupling wires 71, such spurious attenuation pole can be moved away from the passband so that it will not interfere with the operation of the filter. The detailed explanation of this operation is discussed in Section II— Nature And Use of a Diameter Mode Type Disc.

The use of four discs, including one diameter mode disc at one end thereof, is the minimum number of discs needed to obtain a mechanical filter section having attenuation poles at both ends of the passband. However, in most applications, additional discs of the circle mode variety will be added in order to improve the overall selectivity of the system, i.e., to make the skirts of the frequency response curve steeper.

Figure 2:
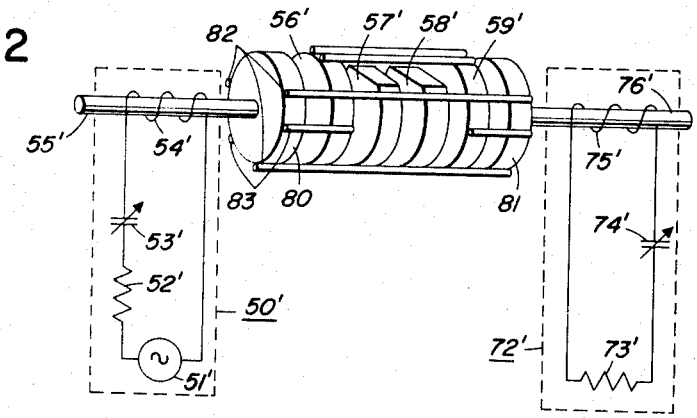
FIG. 2 is another combination perspective view and schematic diagram of a mechanical filter comprised of six discs with the four center discs comprising the same structure as the four-disc structure of FIG. 1 and with the two end discs being circular mode type discs.
Figure 3:
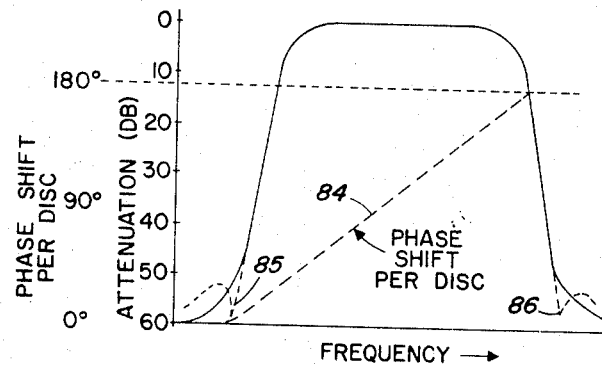
FIG. 3 is a combination frequency response and phase shift response curve of filters of the type shown in FIGS. 1 and 2.

Such a mechanical filter is shown in FIG. 2. More specifically, in FIG. 2 there is shown a six-bit mechanical filter with the four center discs 56′, 57′, 58′ and 59′ corresponding to the four discs 56, 57, 58 and 59 of FIG. 1. In addition, there are two circular mode type discs 80 and 81, positioned at either end of the four-disc section to provide a six-disc filter.

While the addition of the two discs 80 and 81 shown in FIG. 2 is not necessary to the invention, it is thought desirable to show such a structure to illustrate generally how the four-disc element mechanical filter section of the invention is utilized with other circular mode discs in a larger mechanical filter section.

In FIG. 2 the connecting wires 93 are decoupling wires and function in the same manner as decoupling wires 71 of FIG. 1.

(II) *Nature and use of a diameter mode type disc.*— A principal difference between the circular mode type disc and the diameter mode type disc is illustrated in FIGS. 4*a* and 4*b*, with FIG. 4*a* illustrating the general operation of a circular mode type disc and FIG. 4*b* illustrating the general operation of a diameter mode type disc.

In FIG. 4*a* it will be observed that the vibrations occur in a concentric manner around the axis of the disc so as to form a circular node 100; the circular node being the line or the points at which no amplitude variation occurs. In FIG. 4*b* the amplitude nodes occur along the diameters of the disc as represented by dotted lines 101, 102 and 103 which divide the disc into six pie-shaped segments, with each section having a mechanical vibration which is 180 degrees out of phase with the vibrations of the adjacent sections, as indicated in FIG. 4*b*.

It should be noted that each disc has both a circular mode of vibration and a diameter mode of vibration. However, the frequencies of the two modes of vibration are differnt. For example, in FIG. 4 if it is assumed that the frequency of the circular mode of vibration is 75 kc., then, with the same disc, the diameter mode of vibration occurs at a higher frequency of about 95.29 kc. From the foregoing it is apparent that if a disc is reduced in thickness its diameter mode can be made to be equal to the circle mode of another disc which has not been reduced in thickness. Such difference in thickness between a diameter mode disc and a circular mode disc is illustrated in FIG. 1.

Another characteristic of a diameter mode disc is that a second diameter mode type resonance occurs when a coupling wire is attached to the edge of the disc thus, in effect, providing a load on the disc. Reference is made to FIG. 5*a* and FIG. 5*b*. In FIG. 5*a* there is shown a disc with a three diameter mode vibration and with a coupling wire 115 attached thereto. The specific diameter mode vibration of FIG. 5*a* can be seen to coincide with the point at which the coupling wire is attached. It should further be understood that the frequency of the diameter mode of vibration of the disc of FIG. 5*a* is the same as if the coupling wire were not secured to the disc. When the coupling wire 115 is present, however, there is created a second diameter mode of vibration which is near that of FIG. 5*a* in frequency, which is shifted angularly in position, as illustrated in FIG. 5*b*. To give an idea of the order of magnitude of the two resonant frequencies, if resonant frequency $f_2$ of the mode of FIG. 5*a* were 96.56 kc., then in FIG. 5*b*, using the same disc with the coupling wire attached thereto, the resonant frequency $f_1$ of the mode shown therein might be 96.15 kc. The aforementioned frequencies are actual frequencies taken from a specific disc.

It is apparent from the foregoing that the placement of coupling wires around the periphery of a group of discs will affect the behavior of coupled pairs of discs depending on the modes of vibration of the discs, i.e., whether the discs employ a circle mode or a diameter mode type of vibration. One effect, however, which is present regardless of type mode of vibration is that as the diameters of the coupling wires are increased, the spacing between the natural resonance is increased. In the case of a pair of discs, both of which have the circle mode of vibration, the increase of the spacing between the natural resonances is the main effect; the placement of the coupling wires around the perimeter of the discs being a noncritical matter. Also, if one of the discs is a diameter mode type disc and the coupling wires are spaced 120 degrees apart, substantially the same effect will be obtained as in the case where both the discs were circular mode type discs, but with the addition of an extra resonance as discussed above.

If, however, one or more coupling wires, are provided at spacings other than 120 degrees, an important new mechanism is introduced, as shown in FIG. 6. In FIG. 6 a diameter mode disc 118 is coupled to a circle mode disc 120 by means of three coupling wires 117 which are spaced apart 120 degrees. The energy transferred from disc 118 to 120 through these coupling wires 117 is in phase and additive. Now, if a fourth wire 119 is connected between the two discs at the position shown in FIG. 6 a transfer of energy of a different phase will occur. More specifically, the energy transferred via decoupling wire 119 will be 180 degrees out of phase with the energy transferred through coupling wires 117.

The electrical equivalent circuit of the structure of FIG. 6 is shown in FIG. 7. More specifically, the tank circuit 122 corresponds to the resonant frequency mode of the diameter mode disc, as shown in FIG. 5b; the tank circuit 123 corresponds to the resonant frequency mode of a diameter mode disc, as shown in FIG. 5a. The tank circuit 124 represents the resonant frequency of circle mode disc 120 of FIG. 6, with inductor 125 representing the coupling wires 117 and inductor 126 representing decoupling wire 119 of FIG. 6. The $-1$ to $1$ transformer 127 represents the fact that the decoupling wire 119 transfers energy 180 degrees out of phase with coupling wires 117 of FIG. 6.

It will be noted that there are three different natural resonant frequency poles of the input impedance occurring in the structure of FIG. 6. These three resonant frequencies $f_a$, $f_b$ and $f_c$ are plotted in FIG. 8 as a function of the number of decoupling wires, such as decoupling wire 119 of FIG. 6. More specifically, in FIG. 8 the x-axis is scaled in frequency and the y-axis in number of decoupling wires; extending from zero coupling wires to three coupling wires. Thus in the bottom line of the chart of FIG. 8 the three points 130, 131, and 132 represent the frequencies $f_a$, $f_b$ and $f_c$, respectively. It will be noted that $f_a$ and $f_b$ are spaced very closely together. The lowest resonant frequency ordinarily defines the lower end of the passband. Accordingly, in this case the frequency $f_a$ defines the lower end of the passband. From Foster's Theorem it is evident that the effect of the nearby resonant frequency $f_b$ will be to provide a spurious attenuation pole somewhere on the lower skirt of the frequency response curve of the filter. Such an attenuation dip is an undesirable characteristic and introduces distortion problems in the operation of the filter.

It has been found that by increasing the number of decoupling wires, such as decoupling wire 119 of FIG. 6, the frequencies $f_b$ and $f_c$ will increase, i.e., will move to the right in FIG. 7; whereas, the resonant frequency $f_a$ will not move appreciably. When a second decoupling wire is added, the frequencies $f_b$ and $f_c$ move even farther to the right in the chart of FIG. 7. Similarly, when a third decoupling wire is added, additional movement of frequencies $f_b$ and $f_c$ to the right in FIG. 7 occurs.

Returning again to FIG. 8, it should be noted that the transmission zero (or impedance pole) will fall somewhere between the frequency $f_a$ and $f_b$ in accordance with Foster's Theorem. Furthermore, it is evident from FIG. 8 that the resonant frequencies $f_b$ and $f_c$ have moved far enough away from the resonant frequency $f_a$ when one or more decoupling wires have been added to eliminate the effect of resonant frequency $f_a$ upon the passband of the filter.

With the background discussion of the diameter mode type disc now completed, the specification will set forth a mathematical analysis of the electrical circuit equivalents of the mechanical filter to show how diameter mode discs can be employed to provide attenuation poles on both sides of the frequency response carrier.

Figure 11:
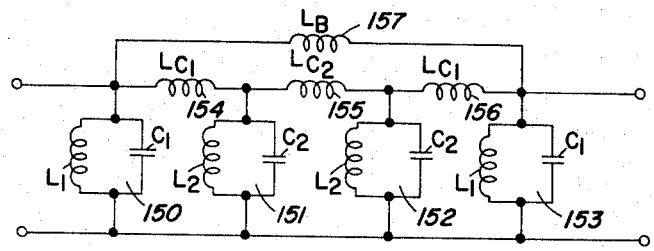
FIG. 11 shows an equivalent electrical circuit of a four-disc mechanical filter.

(III) *Discussion of circuit transformations employed herein and mathematical analysis thereof.*—In FIG. 11 there is shown a circuit diagram of a filter which is the electrical equivalent of a four-disc mechanical filter with a bridging wire extending from the first to fourth disc and passing over the two middle discs. More specifically, in FIG. 11 the tank circuits 150, 151, 152 and 153 represent the discs, the inductors 154, 155 and 156 represent conventional coupling wires which extend from disc to disc and are secured to each disc, and the inductor 157 represents the bridging wire which extends from the first disc to the fourth disc. It will be observed in FIG. 11 that the capacitors and inductors shown there are given letter notations such as $C_1$, $C_2$, $L_1$, $L_2$, $L_{c1}$, $L_{c2}$ and $L_b$. These notations are provided in order to permit the reader to more easily understand the relative values of these circuit components in the transformations which follow in FIGS. 12 through 19.

In general what will be set forth in the following analysis is as follows. The circuit of FIG. 11 will be transformed into the circuit of FIG. 15 which is a lattice-type network. The impedances $Z_a$ and $Z_b$ in FIG. 15 will then be made to relate to each other in the manner shown in FIG. 16 with the poles of the two impedances $Z_a$ and $Z_b$ occurring at the zeros of the other impedance. Such an arrangement is a standard one for a multistage filter circuit.

Figure 15:
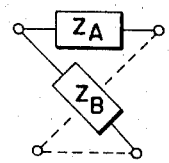
FIG. 15 shows a lattice-type network utilizing the short-circuited and open-circuited impedances obtained in FIGS. 13 and 14.

A mathematical analysis will then be made of the circuit of FIG. 15 with certain basic relations being ultimately evolved. From these ultimate expressions it will be shown that it is possible to have a mechanical filter section with attenuation poles on both sides of the frequency response curve. However, in order to do so it will be shown that the inductor $L_b$ of FIG. 11 must be a negative inductance.

Then by the use of the circuit transformations of FIGS. 17a and 17b it will be shown how the circuit of FIG. 11, with a negative value of $L_b$, can be transformed into the mechanically realizable structure of FIG. 19 in which the negative value of $L_b$ has been transformed into a positive inductance.

It is necessary that such a transformation be made since a negative inductance per se is an imaginary quantity and cannot be obtained in a practical construction. However, in the circuit of FIG. 19 the transformation to a positive inductance is made and is realizable in a corresponding element of a mechanical filter. More specifically, the bridging wire 60 of FIG. 1 forms the equivalent of the positive inductance of FIG. 19.

Returning again to the circuit of FIG. 11, it will be shown how the lattice-type circuit of FIG. 15 is obtained.

Figure 12:
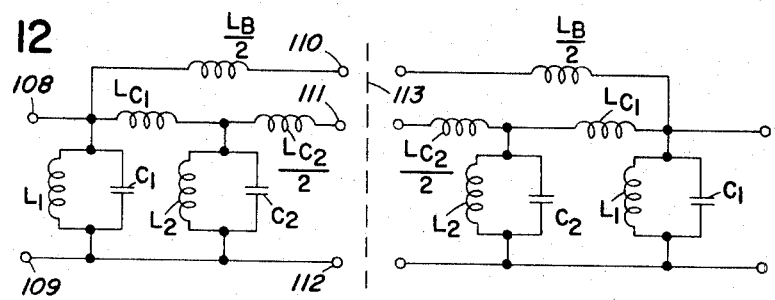
FIG. 12 shows a circuit of FIG. 11 split into two equal and mirrored parts in preparation for a transformation in accordance with Bartlett's Theorem.

In accordance with Bartlett's Bi-section Theorem, the circuit of FIG. 11 is divided into two equal parts, as shown in FIG. 12. The values of $L_b$ and $L_{c2}$ must be halved in order to form the circuit of FIG. 12.

Figure 13:
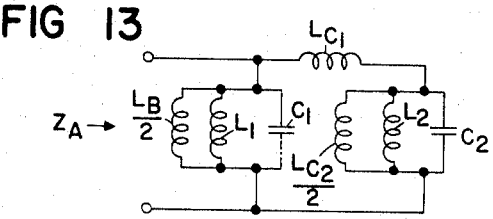
FIGS. 13 and 14 show, respectively, the short-circuited and open-circuited impedances of the left half of the circuit of FIG. 12.

Further, in accordance with Bartlett's Theorem, the lattice-type network of FIG. 15, comprised of impedances $Z_a$ and $Z_b$, can be formed by measuring the short circuit impedance and the open circuit impedance of one-half of the circuit of FIG. 12. More specifically, $Z_a$ which is the short-circuited impedance of one-half of the circuit of FIG. 12, is measured by looking into the terminals 108 and 109 of the left-hand half of FIG. 12, with terminals 110, 111 and 112 short-circuited. The resultant impedance $Z_a$ is shown in FIG. 13.

Figure 14:
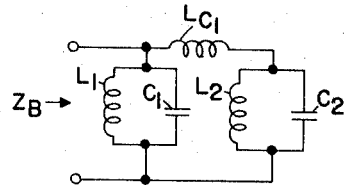

In a similar manner the open circuit impedance $Z_b$ of the left-hand half of FIG. 12 is obtained by looking into the terminals 108 and 109 with terminals 110, 111 and 112 open-circuited. The resultant impedance $Z_b$ is shown in FIG. 14.

Then, in accordance with Bartlett's Theorem, the lattice-type network of FIG. 15 can be formed with the impedance $Z_a$ forming the sides or legs, of the circuit and the open-circuited impedance $Z_b$ forming the diagonal arms of the circuit.

It is to be noted that the use of the circuit of FIG. 15 rather than the circuit of FIG. 11 is employed, since an analytical treatment of the lattice-type circuit of FIG. 15 is simpler than an analytical treatment of the circuit of FIG. 11, and facilitates what is known in the art as an image parameter design.

Figure 16:
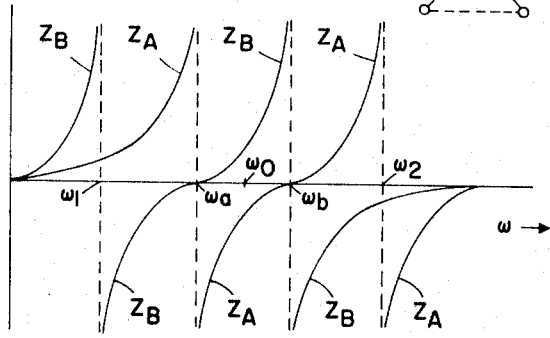
FIG. 16 shows a reactance curve of the circuit of FIG. 15 with the poles and zeros of the two impedances of FIG. 15 being made to occur at the same frequency point, in order to provide good filtering action.

From FIG. 15 and the curves of FIG. 16 the expressions for $Z_a$ and $Z_b$ can be determined as follows:

$$Z_a = \frac{-j\omega(\omega^2 + \omega_b^2)}{C_1(\omega^2 + \omega_a^2)(\omega^2 + \omega_2^2)} \quad (1)$$

$$Z_b = \frac{j\omega(\omega^2 + \omega_a^2)}{C_1(\omega^2 + \omega_1^2)(\omega^2 + \omega_b^2)} \quad (2)$$

where $C_1$ represents the first resonator's equivalent mass as shown in FIG. 11.

The image parameters $Z_0$ and $Y_I$ are found to be as follows:

$$Z_0(j\omega) = \sqrt{Z_A Z_B} = \frac{-j\omega}{C_1}\left[\frac{1}{\omega^4 - (\omega_1^2 + \omega_2^2)\omega^2 + \omega_1^2\omega_2^2}\right]^{1/2} \quad (3)$$

$$Y_I(j\omega)\sqrt{\frac{Z_B}{Z_A}} = \sqrt{\frac{(\omega^2 - \omega_a^2)(\omega^2 - \omega_2^2)}{(\omega^2 - \omega_1^2)(\omega^2 - \omega_b^2)}} \quad (4)$$

where $Z_0$ is the image impedance and $Y_I$ is the index function.

Using Expressions 1 through 4, the analytical treatment of the circuit of FIG. 12 can become quite lengthy. In order to simplify the algebra somewhat, certain transformations will now be introduced into the analysis. These transformations, which will follow, function generally to simplify the algebra in that the axes of the curves representing the various characteristics are changed so that the center frequency $\omega_0$ will fall at zero and the lower and upper limits of the passband $\omega_1$ and $\omega_2$ will fall at a minus 1 and plus 1, respectively, on the $x$ axis.

To effect such change the following transformations are needed:

$$y = \frac{2(\omega^2 - \omega_0^2)}{\omega_2^2 - \omega_1^2} \quad (5)$$

$$\omega_0 = \sqrt{\frac{\omega_1^2 + \omega_2^2}{4}} \quad (6)$$

where $\omega$ is a variable and can be $\omega_a$ or $\omega_b$, in which case $y$ would be $y_a$ or $y_b$.

In writing Expression 4 in terms of $y$ variable of Expression 5 we have $$Y_I \sqrt{\frac{(y-1)(y-y_a)^2}{(y+1)(y-y_b)^2}} \quad (7)$$

It can be shown in the synthesis of arms $Z_a$ and $Z_b$ that $y_a = y_b$ for the coupling inductors $L_{c1}$ (see FIG. 11) in both arms to be equal. Using this relationship Expression 7 may be rewritten as follows:

$$Y_I = \sqrt{\frac{(y-1)(y+y_b)^2}{(y+1)(y-y_a)^2}} \quad (8)$$

The attenuation can then be expressed in the following manner:

$$A(dc) = 20 \log_{10}\left|\frac{\sqrt{\frac{(y-1)(y+y_b)^2}{(y+1)(y-y_b)^2}}}{\sqrt{\frac{(y-1)(y+y_b)^2}{(y+1)(y-y_b)^2}}}\right| \quad (9)$$

And the phase shift can be expressed:

$$\theta(y) = 2\tan^{-1}\sqrt{\frac{(1-y)(y_1+y_b)^2}{(1+y)(y-y_b)^2}} \quad (10)$$

The group phase delay of the circuit is then determined in the following manner. Such group delay is defined, generally, as the rate of change of phase over the rate of change of $\omega$, which may be expressed in the following manner:

$$t_g = \frac{d\theta(\omega)}{d\omega} = \frac{dy}{d\omega} \cdot \frac{d\theta(y)}{dy} \quad (11)$$

By differentiating the Expression 10 the following expression is obtained:

$$\theta'(y) = \frac{(1-2y_b)y^2 + 2y_b - y_b^2}{[(1-2y_b)y^2 + y_b^2]\sqrt{1-y^2}} \quad (12)$$

However, expression 12 is a differential of the phase $\theta$ with respect to Y; whereas, the group delay $t_g$ is defined by Expression 11 as $d\theta/d\omega$. To obtain $d\theta/d\omega$ it is necessary to multiply Expression 12 by $dy/d\omega$, as indicated in Expression 11. The quantity $dy/d\omega$ is obtained by taking the derivative of Expression 5 with the following results:

$$\frac{dy}{d\omega} = \frac{4\omega}{\omega_2^2 - \omega_1^2} \quad (13)$$

multiplying Expression 12 by Expression 13 we obtain:

$$t_g = t_{g0}\frac{y_b[(1-2y_b)y + 2y_b - y_b^2]}{(2-y_b)[(1-2y_b)y^2 + y_b^2]\sqrt{1-y^2}} \quad (14)$$

where $t_{g0}$ is equal to $$t_{g0} \cong \frac{2}{B}\left(\frac{2-y_b}{y_b}\right) \quad (15)$$

with $$B = \omega_2 - \omega_1 \quad (16)$$

Letting Expression 8 become equal to unity, the frequencies of infinite attenuation occur when:

$$(y_\infty - 1)(y_\infty + y_b)^2 = (y_\infty + 1)(y_\infty - y_b)^2 \quad (17)$$

expanding and collecting terms there results:

$$y_\infty = \pm\sqrt{\frac{y_b^2}{2y_b - 1}} \quad (18)$$

Expression 18 shows that for $\frac{1}{2} < y_b < 1$ two frequencies of infinite attenuation will occur; one of such frequencies occurring on either side of the passband. For $0 < y_b < \frac{1}{2}$, $y_\infty$ will be imaginary and no finite frequency transmission zeros will occur.

Expression 17 can also be solved for $y_b$ as follows:

$$y_b = y_\infty^2 - y_\infty\sqrt{y_\infty^2 - 1} \quad (19)$$

Element values of FIG. 19 can be found by synthesizing the lattice arms of FIG. 15 and are given by:

$$C_1 = \frac{1}{R_0(\omega_2 - \omega_1)} \quad (20)$$

$$L_1' = \frac{2R_0}{(\omega_1 + \omega_2)(F + 1 - 2y_b - 2r\sigma)} \quad (21)$$

$$L_2 = \frac{R_0}{(\omega_1 + \omega_2)r[r(F - y_b) - \sigma]} \quad (22)$$

$$L_{c1} = \frac{R_0}{(\omega_1 + \omega_2)r\sigma} \quad (23)$$

$$L_{c2} = \frac{R_0}{(\omega_1 + \omega_2) r^2 y_b} \quad (24)$$

$$L_b = \frac{2R_0}{(\omega_1 + \omega_2)(1 - 2y_b)} \quad (25)$$

where $$\sigma = \sqrt{y_b - y_b^2} \quad (26)$$

$$F = \frac{\omega_1^2 + \omega_2^2}{\omega_2^2 - \omega_1^2} \quad (27)$$

$$r = \sqrt{\frac{C_2}{2C_1}}$$

or $$C_2 = 2r^2 C_1 \quad (28)$$

and $R_0$ is the design impedance of the section.

Returning now to Expression 9, it can be seen that by selecting certain values of $y$, attenuation poles can be obtained. More specifically, when Y of Expression 8 is equated to 1, the attenuation will be infinite. Expression 17 shows the expansion of the index function of Expression 8 when made equal to unity and Expression 18 gives the expression for $y_\infty$ in terms of $y_b$, with $y_\infty$ representing frequencies of infinite attenuation.

It can be seen from Expression 18 that when $1 > y_b > \frac{1}{2}$, there are two real roots for Expression 18, thus defining two infinite attenuation points, one on either side of the passband. When $y_b$ is less than one-half the roots are imaginary and no finite frequency transmission zeros occur. It should be noted that the maximum value for $y_b$ is unity, since $y_b$ represents a normalized definition of $\omega$(frequency), as defined in Expressions 5 and 6.

Figure 9:
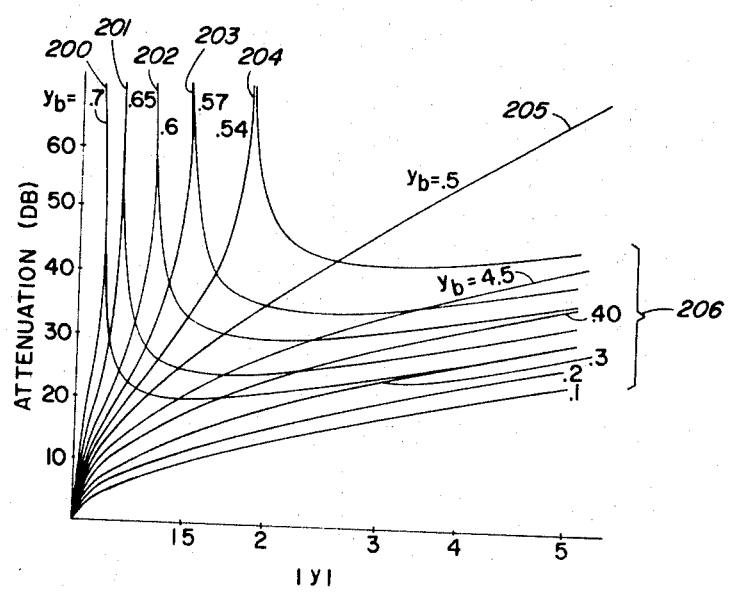
FIG. 9 is a family of curves showing the particular design conditions under which attenuation poles on either side of the bandpass can be obtained.

The plot of the attenuation versus $y$ for different values of $y_b$ is shown in FIG. 9. For different values of $y_b$ between .7 and .54 are shown several points of infinite transmission attenuation (attenuation poles), such points being designated by reference characters 200 to 204.

When $y_b$ is exactly equal to .5 no transmission zero occurs, but rather the response characteristic is as represented by the line 205.

When $y_b$ is made less than .5 the curves extend to the right, as indicated by the family of curves 206 and no attenuation poles occur.

As an illustration of how the transformation from the $\omega$ variable to the $y$ variable operates in Expression 5, reference is made to the following Expressions 29 through 33 and to curves of FIG. 20:

$$y_1 = \frac{2(\omega_1^2 - \omega_0^2)}{\omega_2^2 - \omega_1^2} \quad (29)$$

Expression 29 is the expression for $y_1$ and is obtained by substituting $\omega_1$ for $\omega$ in Expression 5. Substituting the value of $\omega_0$ as shown in Expression 6 into Expression 29, the following expression is obtained:

$$y_1 = \frac{2\omega_1^2 - \omega_1^2 - \omega_2^2}{\omega_2^2 - \omega_1^2} = \frac{\omega_1^2 - \omega_2^2}{\omega_2^2 - \omega_1^2} = -1 \quad (30)$$

Similarly, by substituting $\omega_2$ for $\omega$ in Expression 5 Expression 31 is obtained, which when expanded, is as follows:

$$y_2 = \frac{2(\omega_2^2 - \omega_0^2)}{\omega_2^2 - \omega_1^2} \quad (31)$$

Expanding Expression 31 by substituting the value of $\omega_0$ therein as defined in Expression 6, the following expression is obtained:

$$y_2 = \frac{\omega_2^2 - \omega_1^2}{\omega_2^2 - \omega_1^2} = +1 \quad (32)$$

It can be seen that $y_2$ is equal to $+1$, as shown in FIG. 21.

The third major value of $y$ is $y_0$ which corresponds to the $\omega_0$, or the center frequency of the passband. Substituting $\omega_0$ for $\omega$ in Expression 5 there is obtained the following expression:

$$y_0 = \frac{2(\omega_0^2 - \omega_0^2)}{\omega_2^2 - \omega_1^2} = 0 \quad (33)$$

It can be seen that $y_0$ is equal to zero, as indicated in FIG. 20.

Thus the passband has been expressed in terms of a variable $y$ which has as its lower limit a $-1$ and as its upper limit a $+1$, with the center frequency being equal to zero, in terms of the $y$ variable. The values of $Z_b$ and $Z_a$ have thus been normalized in terms of a new variable $y$. The values of $y_a$ and $y_b$ are, by definition, made equal to each other in the present circuit and are variable.

Figure 10:
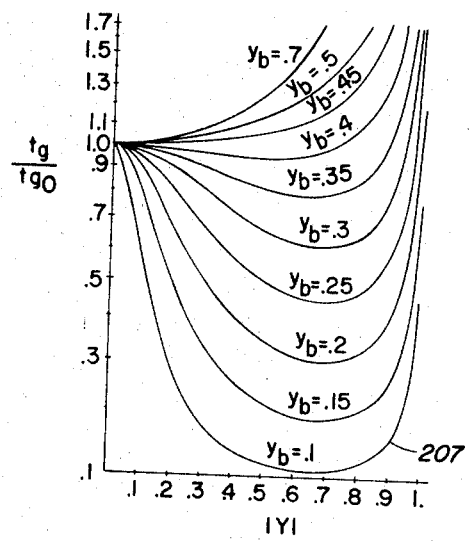
FIG. 10 is another family of curves illustrating the group delay of the mechanical filter and its relation to the obtaining of the attenuation poles as shown in FIG. 9.

In FIG. 10 there is shown a plot of the Expression 14 divided by the term $t_{g0}$. The curves of FIG. 10 represent generally the group delay of the mechanical filter section with different values of $y_b$. While the curves of FIG. 10 do not form a part of the present invention, per se, it should be observed that when a pronounced dip in the group delay occurs, as in the lowest curve 207 of FIG. 10, for example, $y_b$ is at a value less than .5. This group delay characteristic is opposite in shape to the group delay characteristic of a conventional mechanical filter section. By coupling a conventional mechanical filter section together with one of the type described in the present invention with a $y_b$ less than one-half, a group delay compensated mechanical filter can be otained. Such a filter is described in copending application Ser. No. 553,520, filed May 27, 1966, by Donald L. Bise and entitled "Mechanical Filter Section with Envelope Delay Compensation Characteristic."

It has been established above that to obtain attenuation poles on either side of the bandpass characteristic curve the following conditions must be met: $1 > y_b > \frac{1}{2}$.

Expression 25 shows $L_b$ in terms of $y_b$. It is to be noted that $L_b$ of Expression 25 is the $L_b$ of the filter of FIG. 11, which $L_b$ corresponds to the bridging wires 60 of FIG. 1. However, in Expression 25, if $y_b$ is made greater than one-half but less than one, $L_b$ must necessarily be negative.

Since it is physically impossible to realize a negative inductance, some means must be provided to transform the negative inductance $L_b$ of FIG. 11 ($1 > y_b > \frac{1}{2}$) into a positive inductance. Such transformations are made with the aid of the circuits of FIGS. 17a and 17b. The circuits of FIGS. 17a and 17b are equivalents and can be substituted one for the other.

In order to prepare the circuit of FIG. 11 for such a substitution such circuit should first be redrawn as shown in FIG. 18, with the inductors 210 and 211 being provided. The inductors 210 and 211 are created from the inductors of value $L_1$ in FIG. 11. Thus, in FIG. 18 the resultant inductance of inductors 210 and 212 is equal to that of inductor $L_1$ of FIG. 11. Similarly, the resultant inductance of parallel inductors 213 and 211 of FIG. 18 is equal to that of inductor $L_1$ of FIG. 11.

In FIG. 18 the inductors 210, 211, and $L_b$ which form a network corresponding to the circuit of FIG. 17b, can now be transformed into a network corresponding to the circuit of FIG. 17a to produce the resultant circuit shown in FIG. 19. The negative inductor $L_b$ of FIG. 18 has now become a positive inductor $-L_b$ in FIG. 19 and the transformer 215 has been added into FIG. 19. The transformer 215 has a $-1:1$ ratio, with the output voltage inverted by 180°. Such a transformer can be effected mechanically by placing the bridging wire on one of the 180 degrees out-of-phase portions of the diameter mode disc discussed previously.

Thus in FIG. 18 there is a resultant schematic diagram of a filter circuit with known values for $L_1'$, $L_2$, $L_{c1}$, $L_{c2}$, $C_1$, $C_2$ and $L_b$ which will produce attenuation poles on both sides of the frequency response characteristic.

Discs and decoupling wires for the mechanical filter of FIG. 1 can be formed which have a mechanical value corresponding precisely to the electrical values which can be computed for the circuit of FIG. 19. The procedures for making the electrical to mechanical transformations are well known in the art and will not be described in detail herein.

It is to be understood that the form of the invention shown and described herein is but a preferred embodiment thereof and that various changes may be made in the mechanical structure as to the number of discs, the number of coupling wires, and the number of decoupling wires without departing from the spirit or scope thereof.

I claim:

1. A mechanical filter structure comprising:
a first plurality of discs comprising first, second, third, and fourth discs arranged in the order listed in a stacked position with their axes lying along a common line and spaced apart a distance less than half the wavelength of their natural resonant frequency;
said first disc being a diameter mode type disc and said second, third, and fourth discs being circular mode type discs;
first wire-like coupling means extending along the stack of discs and secured to the perimeters thereof to hold said discs in said stacked arrangement;
said first wire-like coupling means being secured to points on the perimeter of said diameter mode disc, all having a first phase of vibration;
second wire-like bridging means secured to said first disc and said fourth disc and bridging across said second and third discs;
said second wire-like bridging means being connected to a point on the perimeter of said first disc having a phase of vibration opposite to that of said first phase of vibration;
the parameters of said discs, said first wire-like coupling means, and said second wire-like bridging means being in accordance with the expression:

$$y_\infty = \pm \sqrt{\frac{y_b^2}{2y_b - 1}}$$

where $y_\infty$ represents a points of infinite attenuation, $y_b$ is as defined in the specification, and where $1 > y_b > \frac{1}{2}$.

2. A mechanical filter structure is accordance with claim 1 in which said second and third discs have a section of their perimeters removed to provide a path for said wire-like bridging means to pass from said first disc to said fourth disc without touching said second and third discs.

3. A mechanical filter in accordance with claim 2 comprising:
third wire-like decoupling means secured to the perimeter of said diameter mode disc at a point whose phase of vibration is opposite that of said first phase of vibration and also attached to the perimeter of an adjacent circular mode disc.

4. A mechanical filter in accordance with claim 1 comprising:
third wire-like decoupling means secured to the perimeter of said diameter mode disc at a point whose phase of vibration is opposite that of said first phase of vibration and also attached to the perimeter of an adjacent circular mode disc.

5. A mechanical filter structure in accordance with claim 1 in combination with a second mechanical structure comiprsing:
a second plurality of circular mode discs positioned in a stacked arrangement with their axes lying along said common line and positioned apart a distance less than one-half the wavelength of their natural resonant frequency;
said first wire-like coupling means being constructed to extend along the stacked arrangement of said second plurality of discs and secured to the perimeters of the discs of said second plurality of discs.

6. A mechanical filter in accordance with claim 5 comprising:
third wire-like decoupling means secured to the perimeter of said diameter mode disc at a point whose phase of vibration is opposite that of said first phase of vibration and also attached to the perimeter of an adjacent circular mode disc.

7. A mechanical filter structure in accordance with claim 3 in which said second and third discs have a section of their perimeters removed to provide a path for said wire-like bridging means to pass from said first disc to said fourth disc without touching said second and third discs.

8. A mechanical filter in accordance with claim 7 comprising:
third wire-like decoupling means secured to the perimeter of said diameter mode disc at a point whose of vibration is opposite that of said first phase of vibration and also attached to the perimeter of an adjacent circular mode disc.

9. A mechanical filter structure comprising:
a first plurality of discs comprising first, second, third, and fourth discs arranged in the order listed in a stacked position with their axes lying along a common line and spaced apart a distance less than half the wavelength of their natural resonant frequency;
said first disc being a diameter mode type disc and said second, third, and fourth discs being circular mode type discs;
first wire-like coupling means extending along the stack of discs and secured to the perimeter thereof to hold said discs in said stacked arrangement;
said first wire-like coupling means being secured to the perimeter of said diameter mode disc in an area having a first phase of vibration;
second wire-like bridging means secured to said first disc and said fourth disc and bridging across said second and third discs;
said second wire-like bridging means being connected to the perimeter of said first disc in an area having a phase of vibration opposite to that of said first phase of vibration;
said mechanical filter structure being representable by an equivalent electrical ladder-type network comprising:
first, second, third, and fourth electrical tank circuits as the ladder rungs and arranged in the order listed and corresponding to said first, second, third, and fourth discs, respectively;
a plurality of first inductors coupling together adjacent tank circuits and corresponding to said first wire-like coupling means;
and a second inductor connecting said first tank circuit to said fourth tank circuit, and corresponding to said second wire-like bridging means;
the parameters of said tank circuit, said first inductors and said second inductor being in accordance with Expressions 20 through 28 of the specification; and where $$1 > y_b > \frac{1}{2}$$

10. A mechanical filter structure in accordance with claim 9 in which said second and third discs have a section of their perimeters removed to provide a path for said wire-like bridging means to pass from said first disc to said fourth disc without touching said second and third discs.

11. A mechanical filter in accordance with claim 10 comprising:
third wire-like decoupling means secured to the perimeter of said diameter mode disc at a point whose phase of vibration is opposite that of said first phase of vibration and also attached to the perimeter of an adjacent circular mode disc.

12. A mechanical filter in accordance with claim 9 comprising:

third wire-like decoupling means secured to the perimeter of said diameter mode disc at a point whose phase of vibration is opposite that of said first phase of vibration and also attached to the perimeter of an adjacent circular mode disc.

13. A mechanical filter structure in accordance with claim 9 in combination with a second mechanical structure comprising:

a second plurality of circular mode discs positioned in a stacked arrangement with their axes lying along said common line and positioned apart a distance less than one-half the wavelength of their natural resonant frequency;

said first wire-like coupling means being constructed to extend along the stacked arrangement of said second plurality of discs and secured to the perimeters of the discs of said second plurality of discs.

14. A mechanial filter in accordance with claim 13 comprising:

third wire-like decoupling means secured to the perimeter of said diameter mode disc at a point whose phase of vibration is opposite that of said first phase of vibration and also attached to the perimeter of an adjacent circular mode disc.

15. A mechanical filter structure in accordance with claim 13 in which said second and third discs have a section of their perimeters removed to provide a path for said wire-like bridging means to pass from said first disc to said fourth disc without touching said second and third discs.

16. A mechanical filter in accordance with claim 15 comprising:

third wire-like decoupling means secured to the perimeter of said diameter mode disc at a point whose phase of vibration is opposite that of said first phase of vibration and also attached to the perimeter of an adjacent circular mode disc.

References Cited

UNITED STATES PATENTS

| | | | |
|---|---|---|---|
| 2,906,972 | 9/1959 | Leonard et al. | 333—71 |
| 3,135,933 | 6/1964 | Johnson | 333—72 X |

JOHN KOMINSKI, *Primary Examiner.*

L. J. DAHL, *Assistant Examiner.*

U.S. Cl. X.R.

333—72